United States Patent [19]

Kuroishi et al.

[11] E Re. 31,371

[45] Reissued Sep. 6, 1983

[54] DEVELOPING SYSTEM

[75] Inventors: Shoji Kuroishi, Yokohama; Tsuguo Kimura, Zushi; Masami Emoto, Yokohama; Shiro Yamamoto, Tokyo, all of Japan

[73] Assignee: Ricoh Co., Ltd., Tokyo, Japan

[21] Appl. No.: 297,931

[22] Filed: Aug. 31, 1981

Related U.S. Patent Documents

Reissue of:

[64] Patent No.: 4,052,127
Issued: Oct. 4, 1977
Appl. No.: 593,293
Filed: Jul. 7, 1975

U.S. Applications:

[63] Continuation of Ser. No. 435,270, Jan. 21, 1974, abandoned.

[30] Foreign Application Priority Data

Jan. 24, 1973 [JP] Japan ..... 48-10033
May 7, 1973 [JP] Japan ..... 48-51007

[51] Int. Cl.[3] ..... G03G 15/06; G03G 15/10

[52] U.S. Cl. ..... 355/10; 118/648; 118/659; 355/3 DD

[58] Field of Search ..... 355/10, 3 DD; 118/647, 118/648, 659

[56] References Cited

U.S. PATENT DOCUMENTS

| | | | |
|---|---|---|---|
| 2,756,676 | 7/1956 | Steinhilper | 101/426 |
| 3,599,605 | 8/1971 | Ralston et al. | 118/647 |
| 3,638,610 | 2/1972 | Lyles et al. | 118/647 |
| 3,674,532 | 7/1972 | Morse | 118/647 |
| 3,707,943 | 1/1973 | Matsumoto et al. | 355/10 X |
| 3,749,059 | 7/1973 | Sato | 355/10 X |
| 3,782,818 | 1/1974 | Smith | 355/10 |
| 3,818,864 | 6/1974 | Bickmore | 118/648 |
| 3,822,670 | 7/1974 | Sato et al. | 118/648 |

*Primary Examiner*—Fred L. Braun
*Attorney, Agent, or Firm*—Wyatt, Gerber, Shoup, Scobey & Badie

[57] ABSTRACT

A developing system is provided for a copying process such as an electrophotographic copying process in which a developer is supplied to the surface of a member which is formed with an electrostatic latent image to provide developing thereof. An electrode is disposed opposite the surface of the member with the developer interposed therebetween, and the induction potential of the electrode is maintained below a given value by means of a constant voltage element. The potential of the electrode is induced by either the image portion of the member's surface having the electrostatic latent image or by an unexposed, separate charged portion thereof.

10 Claims, 10 Drawing Figures

DEVELOPING SYSTEM

Matter enclosed in heavy brackets [ ] appears in the original patent but forms no part of this reissue specification; matter printed in italics indicates the additions made by reissue.

This is a continuation of application Ser. No. 435,270 filed Jan. 21, 1974, *now abandoned.*

BACKGROUND OF THE INVENTION

The invention relates to a developing system for use in a copying process such as an electrophotographic copying process, and more particularly to such a system for developing an electrostatic latent image on a member capable of retaining an electric charge.

In a copying process such as an electrophotographic copying process, an electrostatic latent image is formed on a member such as a copying sheet which is capable of retaining an electric charge, and this latent image is subsequently developed. For example, in the electrophotographic copying process, the prior practice has been to charge a photosensitive material, which is subsequently exposed to an image of an article to be copied to have an electrostatic latent image thereof formed thereon. The latent image is then developed and transferred onto a transfer sheet, followed by the fixing thereof. The developing step comprises supplying a developer to the surface of the photosensitive material to develop the electrostatic latent image.

As one of the developing techniques of this kind, a self-bias developing technique has been proposed in which a developer is supplied onto a member on which an electrostatic latent image is formed and which is opposed to an electrically floating, conductive plate (hereinafter referred to as developing electrode). In the self-bias developing technique, the developing electrode is maintained electrically floating so that a potential is induced on the developing electrode by the charge on the image portion of the member in order to attract the toner on the non-image portion of the member to the developing electrode, thereby preventing the background smearing and improving the contrast of the image. However, where the contrast in the image of an original itself is low or where the area of the image portion is small as compared to that of the non-image portion, a sufficiently high potential may not be induced on the developing electrode from the image portion of the member to achieve the self-bias effects, that is, preventing the background smearing and improving the contrast of the image. In addition, the potential of the developing electrode varies depending upon the potential and the size of the image portion, and this results in a disadvantage that the toner on an image area of low density may be attracted toward the developing electrode to cause the loss of such image area when the potential of the developing electrode is too high. While the application of a constant bias voltage from a d.c. source to the developing electrode has been proposed, too high a potential of the developing electrode causes a disadvantage of removing an image area of low density, while too low a potential of the developing electrode can not prevent the background smearing and improve the contrast in the image.

The present inventors have previously proposed a developing system for the electrophotographic copying process in which the potential of the developing electrode is induced by the potential of a part of a photosensitive material which is maintained free from image formation and which is maintained at a constant potential when charged during the charging step. However, such system still suffered from the disadvantages that the induced potential may happen to be too high and that where a plurality of developing electroes are provided, the potential may vary from electrode to electrode, thus precluding a uniform image characteristic over the entire surface of the photosensitive material.

SUMMARY OF THE INVENTION

It is a principal object of the invention to maintain the induced potential of the developing electrode below a given value to thereby eliminate the background smearing and to improve the contrast in the image while avoiding the loss of an image area of reduced density.

It is another object of the invention to use an end portion of a photosensitive material which is charged to a constant potential during the charging step and which is left unexposed in the electrophotographic copying process so that the potential of the developing electrode can be induced principally from this end portion and maintained below a given value, thereby assuring a uniform image developing characteristic over the entire system of the photosensitive material.

It is a further object of the invention to provide a plurality of developing electrodes along the direction of travel of a member having an electrostatic latent image formed thereon, thereby improving the rising characteristic of the induced potential of the developing electrodes.

It is an additional object of the invention to enhance the effect of the developing electrode by additionally increasing the potential of the developing electrode.

DETAILED DESCRIPTION OF THE EMBODIMENTS

Figure 1:
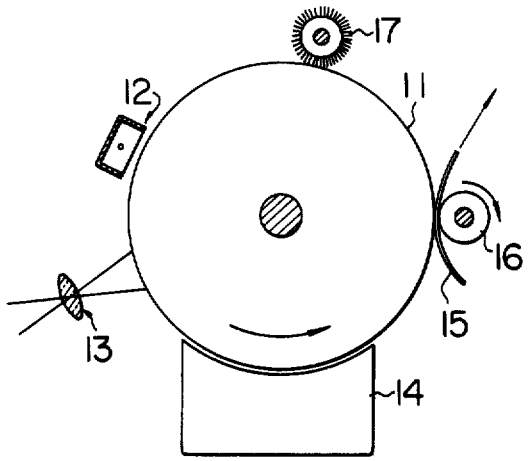
FIG. 1 is a schematic elevation of one exemplary electrophotographic copying apparatus to which the invention can be applied.

Referring to FIG. 1, there is shown an apparatus for carrying out an electrophotographic copying process in accordance with the invention. The apparatus comprises a body, having a peripheral surface of photosensitive material 11, in the form of a drum which is driven by a suitable drive means, not shown, for rotation in the direction indicated by an arrow with a constant speed. During its rotation, the body's surface 11 is adapted to be entirely charged by a charger 12, and then exposed to the image of an article to be copied by an exposure unit 13 to form an electrostatic latent image thereon, which latent image is developed with a developing solution in a liquid developing system 14. In all embodiments of this specification, it is to be assumed that the electrostatic latent images are formed by a negative high voltage. The polarity of the electrostatic latent image is determined generally in connection with the specific character of the photosensitive material. A transfer sheet 15 is supplied from a paper feeder, not shown, into the space between the drum surface 11 and a transfer unit 16 in synchronism with the movement of the drum surface 11 in order to transfer a toner image from the drum surface 11 onto the transfer sheet 15. While the transfer unit 16 is shown as comprising a transfer roller, it will be understood that it may be replaced by an electrostatic transfer unit. Subsequent to the transfer of the toner image thereto at the transfer unit 16, the transfer sheet 15 has its toner image fixed in a fixing unit, not shown, thereby providing a copy sheet, which is discharged externally of the apparatus. Subsequent to the transfer step, the drum surface 11 is cleaned by a cleaning unit 17.

Figure 2:
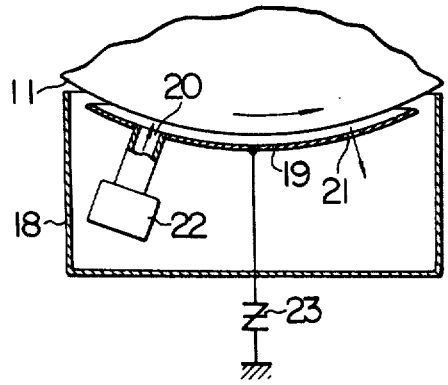
FIGS. 2 to 7 are schematic sections of several embodiments of the liquid developing system according to the invention.

In the electrophotographic copying process above described, the developing step is effected by the liquid developing system 14. In the embodiment shown in FIG. 2, the system 14 comprises a vessel of developing solution 18 located below the drum surface 11, and a counter-electrode 19 disposed within the vessel 18 so as to be opposed to the drum surface 11 with a given space, preferably a spacing between 0.5 to 2 mm. The counter-electrode 19 constitutes an electrically conductive developing electrode, and is formed therein with a liquid inlet 20 and a liquid outlet 21 at positions advanced and retracted with respect to the direction of rotation of the drum surface 11. A developing solution within the vessel 18 is pumped by a pump 22 through the liquid inlet 20 into the space between the drum surface 11 and the counter-electrode 19 for contact with a latent image on the drum surface 11, end is subsequently returned into the vessel 18 through the liquid outlet 21. The counter-electrode 19 is connected to the ground through a constant voltage element, for example, a bidirectional constant voltage element 23, thus allowing a potential to be induced on the electrode by the charge on the drum surface 11. It will be appreciated that the constant voltage element 23 may be a unidirectional constant voltage diode. The potential of the counter-electrode 19 is lower than the potential of the image portion in the latent image on the drum surface 11 and is higher than that of the non-image portion thereof, and is maintained below the threshold value of the constant voltage element 23. As a consequence, the electrostatic latent image on the drum surface 11 is developed by the developing solution supplied, and the toner on the non-image portion is electrically attracted to the counter-electrode 19 to prevent the background smearing and improve the contrast in the image, thus producing the so-called electrode effect. By the arrangement according to the invention, it will be appreciated that the potential of the counter-electrode 19 varies depending upon the electrostatic latent image on the drum surface 11, so that even with an image of lower density, the background smearing is eliminated and the contrast in the image is improved, and further that the potential of the counter-electrode 19 can not increase beyond the threshold value of the constant voltage element 23, thereby preventing the loss of an image area of reduced density.

Figure 3:
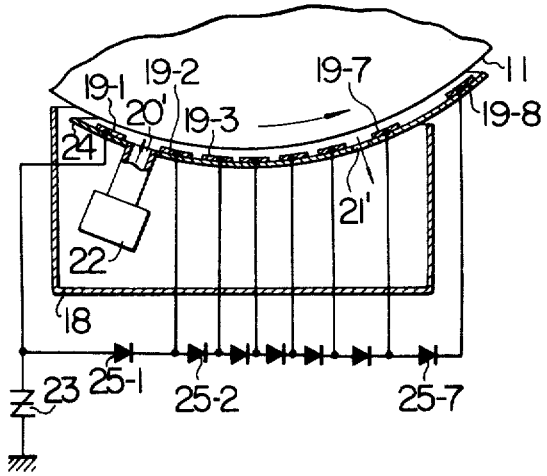

Another embodiment of the liquid developing system according to the invention is shown in FIG. 3 wherein the counter-electrode 19 is divided into a plurality of segments 19-1, 19-2 . . . 19-8 which are disposed along the direction of rotation of the drum 11 with a given spacing therebetween and which are carried on an insulating member 24 having a liquid inlet 20' and a liquid outlet 21' formed therein. A constant voltage element 23 is electrically connected between the segment 19-1 and the ground. A plurality of diodes 25-1, 25-2, . . . 25-7 have their anodes connected with the segments 19-1 to 19-7, respectively, and have their cathodes connected with the segments 19-2 to 19-8, respectively. Potentials are successively induced on the segments 19-1 to 19-8 by the electrostatic latent image on the drum surface 11, and their induced potentials are suitably held below a given value by the constant voltage element 23 and through the diodes 25-1 to 25-7. The division of the counter-electrode into a plurality of segments 19-1 to 19-8 reduces the capacitance of the respective segments, thereby improving the leading edge of the induced potential and hence the electrode effect. The segment 19-8 constitutes an auxiliary counter-electrode which is disposed at a position advanced in the direction of travel of the drum with respect to the location where the developing solution is supplied to the image on the drum 11. This results in the advantage that the potential of the segments 19-1 to 19-7 is increased by the induced potential on the counter-electrode 19-8 through the diodes 25-1 to 25-7, thus assuring an electrode effect in the event sufficient potential is not induced on these segments by the electrostatic latent image on the drum 11. Specifically, if the induced voltage caused by the electrostatic latent image on the drum surface 11 to the respective segments 19-1 to 19-7 is not sufficient by itself, their potential is increased by the induced potential of the segment located at an advanced position, as transmitted through the respective diodes, to a value enough to provide a satisfactory electrode effect. This permits a compensation for the phenomenon that a sufficient induced potential may not be produced within the developing solution.

Figure 4:
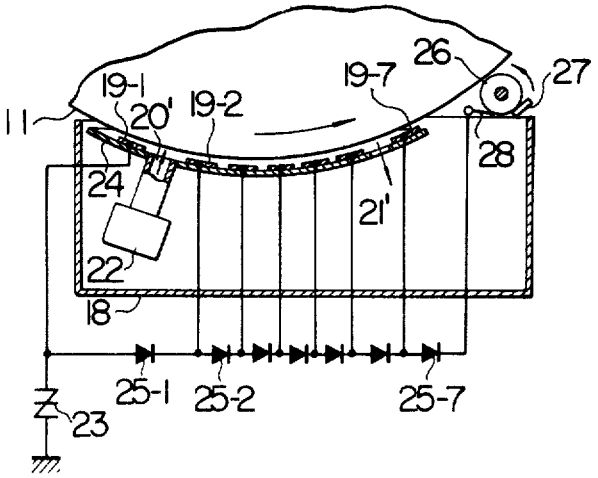

In FIG. 4, the segment 19-8 of FIG. 3 is replaced by a roller 26, which serves to remove residual developing solution after the electrostatic latent image on the drum surface 11 has been developed. The developing solution which has been taken off by the roller 26 is scraped by a developing solution removal member 27 to fall into the vessel 18. Both the roller 26 and the member 27 are formed of an insulating material and are held in abutment against each other. The roller 26 is driven by suitable drive means, not shown, to rotate in the direction indicated by an arrow and is charged to the same polarity as the drum surface 11 by friction with the member 27. A conductive finger 28 contacts the roller 26 and is connected with the cathode of the diode 25-7. As a consequence, the segment 19-7 has its potential increased by the charged potential of the roller 26 as transmitted through the finger 28 and the diode 25-7, thereby assuring a satisfactory electrode effect.

Figure 5:
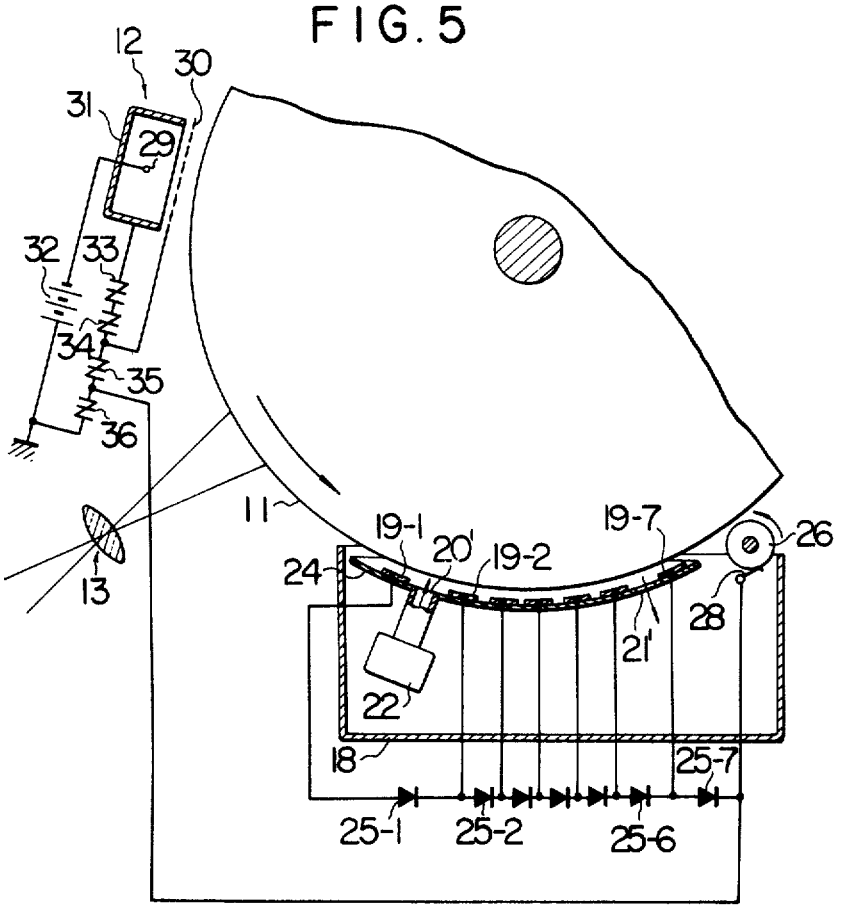

FIG. 5 shows a modification of the embodiment shown in FIG. 4 in that a constant voltage element contained in the charger serves also as the constant voltage element in the liquid developing system. In the example shown, the charger 12 comprises an electrode 29 which is disposed in opposition to the drum 11 with a grid 30 interposed therebetween and which is mounted within a shielding frame 31. A d.c. source 32 is connected between the electrode 29 and the ground, and the shielding frame 31 is connected to the ground through a chain of constant voltage elements 33 to 36, with the grid 30 connected to the junction between the constant voltage elements 34 and 35. The electrode 29 serves to charge the drum 11 by corona discharge through the grid 30. The junction between the constant voltage elements 35 and 36 is connected with the junction between the diode 25-7 and the finger 28, whereby the potential of the segments 19-1 to 19-7 and the roller 26 is maintained [below] *above* a given value.

Figure 6:
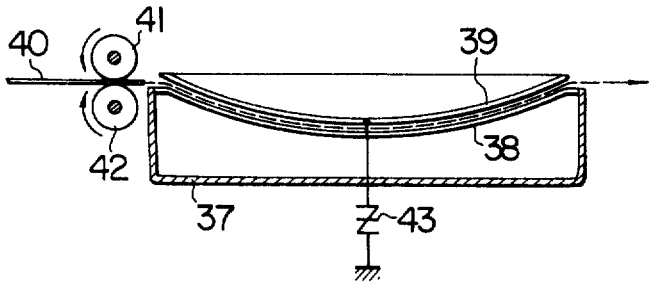

In another electrophotographic copying process, it is known that a photosensitive paper is entirely charged, followed by an imagewise exposure to form an electrostatic latent image, which is developed by a developing solution and finally fixed. The invention can be applied to such a process. Referring to FIG. 6, there is shown a vessel 37 of developing solution within which a guide member 38 is disposed, and a counter-electrode 39 is disposed above the guide member 38 with a given spacing therebetween. A photosensitive paper 40 having an electrostatic latent image formed thereon is passed between a pair of rollers 41 and 42 and is guided by the guide member 38 to advance through the developing solution within the vessel 37 in order to have its latent image developed. Subsequently the photosensitive paper is delivered to a fixing unit. The counter-electrode 39 is connected to the ground through a constant voltage element 43, and produces the similar electrode effect as mentioned above.

Figure 7:
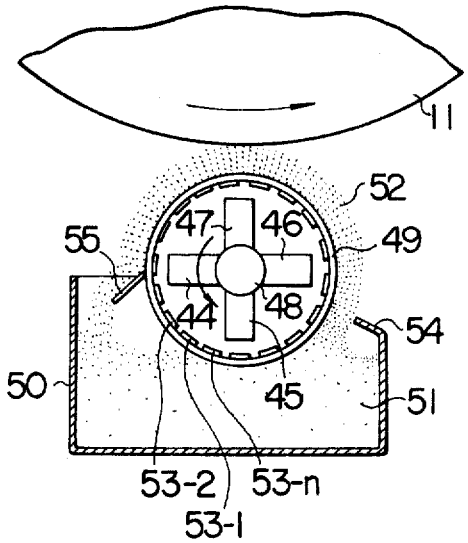

It should be understood that the invention can also be applied to an electrophotographic process using a powder developer rather than a developing solution, for example, a cascade developing process. Furthermore, the invention can equally be applied to an electrophotographic process in which the developing takes place by means of a magnetic brush, as shown in FIG. 7. In the developing system shown, a plurality of magnets 44 to 47 are fixed to an arbor 48 which is driven by suitable means, not shown, for rotation within a hollow cylinder 49. The hollow cylinder 49 is disposed at a position opposite to the drum 11 and is received within a container 50. A developer 51 comprising a mixture of carrier and toner is received within the container 50, and forms a magnetic brush 52 as a result of the attraction acting between the carrier and the magnets 44 to 47. As the magnets 44 to 47 rotate, the magnetic brush 52 also rotates around the cylinder 49 to carry the toner toward the surface of the drum 11 for the purpose of developing. In accordance with the invention, a plurality of counter-electrode segments 53-1, 53-2 . . . 53-n are secured on the inner surface of the cylinder 50 and function in the same manner as mentioned previously to provide an electrode effect. As shown, the container 50 is provided with a brush length adjusting member 54 and a scraper 55 which scrapes off the magnetic brush 52.

While in the above description, the invention has been illustrated with reference to an electrophotographic copying process, it should be understood that the invention can also be applied to copying processes other than the electrophotographic copying process in which a member having an electrostatic latent image formed thereon is to be developed with a developer. It will also be noted that the constant voltage element for maintaining the potential of the counter-electrode below a given value may comprise a plurality of such elements connected in series to provide any desired threshold value.

Figure 8:
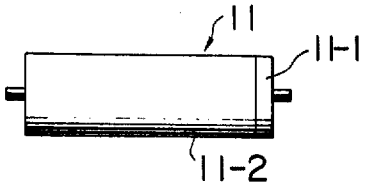
FIG. 8 is an elevation of one exemplary photosensitive material used in the apparatus of FIG. 1.
Figure 9A:
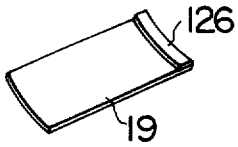
FIGS. 9(a) and 9(b) are perspective views showing examples of the developing electrode shown in FIG. 1.
Figure 9B:
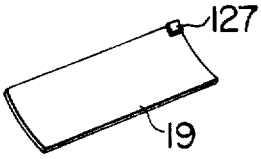

While the above embodiments relate to the induction of the potential of the developing electrode 19 from the image portion on the drum surface 11, it is also possible to induce a potential on the developing electrode 19 from a portion of the drum 11 which is charged to a constant potential and remains unexposed. In contrast to the electrophotographic copying process in which the drum surface 11 is entirely charged by the charger as mentioned previously, FIG. 8 shows a modified body with a surface of photosensitive material 11-2 having an area 11-1 which remains unexposed by the exposure unit 13. Such area may be provided at one end or both ends of the body and may be in the form of a band having a width in the range from 5 to 50 mm, for example. A potential of a given magnitude is induced on the developing electrode 19 by the charged potential on the area 11-1, and is maintained below the threshold value of the constant voltage element 23. The supply of a developing solution to the modified surface 11-2 produces a developing of the electrostatic latent image thereon in the usual manner, and the toner on the non-image portion is electrically attracted by the developing electrode 19 to prevent the background smearing and to improve the contrast in the image, thus producing the electrode effect. The potential of the developing electrode 19 is effectively induced by the potential of the blank area 11-1 to assure a high contrast in the image, and is held below the threshold value of the constant voltage element 23, so that the loss of an image area of reduced density is avoided. Such area 11-1 may comprise an insulating material such as an insulating film or the like. The area 11-1 is kept clear of contact with the transfer sheet, and this may result in overloading the cleaning unit 17. Such an overload can be avoided by providing the developing electrode 19 with a protective member 126 which comprises sponge or felt and is aligned with the area 11-1, as shown in FIG. 9(a), or by providing the developing electrode 19 with a blade 127 comprising an elastomer such as polyurethane rubber, as shown in FIG. 9(b), the member 126 or blade 127 cleaning the area 11-1 of the modified body.

What is claimed is:

1. A developing system for electrophotographic copying apparatus for the type comprising:

a member having a surface of photosensitive material; and means for forming an electrostatic latent image on said photosensitive surface by successive charging and exposure steps;

wherein the improvement comprises:

developing means for supplying a developer to said member to develop the latent image, said developing means comprising an electrode disposed in opposing relationship with the surface of said member with the developer interposed therebetween; and means for [permitting] *enabling* the induced potential on the electrode from said electrostatic latent image to float below a given value, said [permitting] *enabling* means comprising constant voltage means connected between said electrode and ground for preventing said induced potential from exceeding said given value.

2. A developing system as in claim 1 further comprising means for charging an area on at least one end portion of said member adjacent said image surface during the charging step and for keeping said area unexposed during the exposure step, such that said area on the end portion of said member induces a potential on said electrode.

3. A developing system according to claim 1 wherein said electrode comprises a plurality of [electode] *electrode* elements disposed along a direction of travel of the member relative to said developing means, the plurality of electrode elements having a unidirectional conductive characteristic in a direction opposite to said direction of travel of said member.

4. A developing system according to claim 3 further comprising a plurality of diodes respectively connected between adjacent electrode elements to provide the unidirectional conducting characteristic.

5. A developing system according to claim 2 wherein said electrode comprises a plurality of electrode elements, each arranged along the direction of travel of the member of photosensitive material, the plurality of electrode elements having a unidirectionally conducting characteristic in a direction opposite to the travel of the member.

6. A developing system according to claim 5 in which diodes are connected between the adjacent electrode elements of the plurality to provide the unidirectionally conducting characteristic.

7. A developing system according to claim 1 wherein said constant voltage means comprises a constant voltage diode having a threshold value corresponding to said given value.

8. A developing system for an electrophotographic copying apparatus of the type comprising:

a member having a photosensitive surface;

means for forming an electrostatic latent image on said photosensitive surface by successive charging and exposure steps;

wherein the improvement comprises:

developing means for supplying a developer to said surface while moving relative thereto to develop said latent image, said developing means comprising:

an electrode disposed in opposing relationship with said surface with the developer interposed therebetween, said electrode comprising:

a plurality of electrode elements disposed along the direction of travel of said member relative to said developing means and having a unidirectional conducting characteristic in a direction opposite to said direction of travel of said member; and the foremost element of said plurality of electrode elements in said direction of travel of said member having its potential additionally increased.

9. A developing system for electrophotographic copying apparatus of the type comprising:

a member having a surface of photosensitive material;

means for charging said photosensitive surface; and means for exposing said charged photosensitive surface to form an electrostatic latent image thereon;

wherein the improvement comprises:

developing means for supplying a developer to said photosensitive surface while it is moving relative thereto to develop the latent image, said developing means comprising:

an electrode disposed in opposing relationship with said photosensitive surface with the developer interposed therebetween, said electrode comprising a plurality of electrode elements, each arranged along the direction of travel of the member relative to said developing means, said elements having a unidirectionally conducting characteristic in a direction opposite to said direction of travel of said member;

a plurality of diodes respectively connected between adjacent electrode elements for providing the unidirectionally conducting characteristic; and the electrode element which is foremost in said direction of travel of said member having its potential additionally increased;

means for maintaining the induced potential on the electrode from said electrostatic latent image below a given value, said maintaining means comprising:

a constant voltage element connected between said electrode and ground and having a threshold value corresponding to said given value; and means for charging an area on at least one end portion of said member adjacent said image surface during the operation of said charging means and for maintaining said area unexposed during the operation of said exposure means such that said area on the end portion of said member induces a potential on said electrode.

10. A developing system for electrophotographic copying apparatus of the type comprising:

a member having a surface of photosensitive material;

means for charging said photosensitive surface; and means for forming an electrostatic latent image on said charged photosensitive surface;

wherein the improvement comprises:

developing means for supplying a developer to said photosensitive surface to develop said latent image, [and] *said* developing means comprising:

an electrode disposed in opposing relationship with said photosensitive surface with the developer interposed therebetween; and means for maintaining the induced potential on the electrode from said electrostatic latent image [below] *above* a given value, said maintaining means comprising:

a constant voltage element operatively connected to both said electrode and said means for charging said photosensitive surface and connected between said electrode and ground and having a threshold value corresponding to said given value.

* * * * *